(12) United States Patent
Kaufmann et al.

(10) Patent No.: US 9,908,180 B2
(45) Date of Patent: Mar. 6, 2018

(54) TOOL HOLDER FOR A CUTTING INSERT

(71) Applicant: Kennametal Inc., Latrobe, PA (US)

(72) Inventors: Igor Kaufmann, Nürnberg (DE); Anwar Mohideen Abdul, Nuremberg (DE)

(73) Assignee: KENNAMETAL INC., Latrobe, PA (US)

( * ) Notice: Subject to any disclaimer, the term of this patent is extended or adjusted under 35 U.S.C. 154(b) by 242 days.

(21) Appl. No.: 14/944,601

(22) Filed: Nov. 18, 2015

(65) Prior Publication Data

US 2016/0136733 A1    May 19, 2016

(30) Foreign Application Priority Data

Nov. 19, 2014   (DE) .......................... 10 2014 116 915

(51) Int. Cl.
*B23B 27/10*    (2006.01)
*B23B 29/04*    (2006.01)

(52) U.S. Cl.
CPC ............ *B23B 27/10* (2013.01); *B23B 29/043* (2013.01); *B23B 2205/02* (2013.01); *B23B 2250/12* (2013.01); *Y10T 407/25* (2015.01)

(58) Field of Classification Search
CPC ... B23B 27/10; B23B 29/043; B23B 2205/02; Y10T 407/25
See application file for complete search history.

(56) References Cited

U.S. PATENT DOCUMENTS

2008/0131215 A1 * 6/2008 Sjoo ....................... B23B 27/04
407/110
2012/0230780 A1 * 9/2012 Henry ..................... B23B 27/10
407/11
(Continued)

FOREIGN PATENT DOCUMENTS

JP    07-227702 A  *  8/1995 ............. B23B 27/04

*Primary Examiner* — Sunil K Singh
*Assistant Examiner* — Ryan Rufo
(74) *Attorney, Agent, or Firm* — Matthew S. Bedsole

(57) ABSTRACT

The invention relates to a tool holder (10) for a cutting insert (18), having a shank (12), a counter bearing (14) on which a pocket (16) for a cutting insert (18) is provided, disposed on the front end of the shank, and a clamping segment (20) integrally joined to the shank (12) via a bending segment (22); wherein the clamping segment (20) has a clamping finger (28) and a clamping element (26) such that the clamping finger (28) is capable of acting against the counter bearing segment (14) by means of the clamping element (26), thereby enabling a cutting insert (18) to be clamped between the clamping finger (28) and the counter bearing segment (14); wherein the clamping segment (20) protrudes beyond the top side of the shank (12); and wherein a coolant supply passage (40, 42, 44, 46) extends through the shank (12) and the bending segment (22) into the clamping segment (20); wherein the coolant supply passage (40, 42, 44, 46) has a shank passage (46), a clamping finger passage (40), and a connecting passage (44) that starts from the shank passage (46) and extends through the bending segment (22); characterized in that the connecting passage (44) is disposed in a longitudinal center region of the tool holder (10) and, on its rear side (30) facing toward the shank (12), the clamping segment (20) extends less far in a direction toward the rear end of the shank (12) on both sides of the longitudinal center segment than it does in the longitudinal center segment.

10 Claims, 2 Drawing Sheets

(56) References Cited

U.S. PATENT DOCUMENTS

| | | | |
|---|---|---|---|
| 2013/0202372 A1* | 8/2013 | Hecht | B23B 27/10 407/107 |
| 2014/0030033 A1* | 1/2014 | Luik | B23B 27/10 407/11 |
| 2014/0099168 A1* | 4/2014 | Schaefer | B23B 27/10 407/11 |
| 2014/0133924 A1* | 5/2014 | Oren | B23B 29/043 407/11 |
| 2014/0321926 A1* | 10/2014 | Sadikov | B23B 27/10 407/11 |
| 2014/0356082 A1* | 12/2014 | Smith | B23B 27/10 407/11 |

\* cited by examiner

TOOL HOLDER FOR A CUTTING INSERT

RELATED APPLICATION DATA

The present application claims priority pursuant to 35 U.S.C. § 119(a) to German Patent Application Number 102014116915.8 filed Nov. 19, 2014 which is incorporated herein by reference in its entirety.

FIELD

The invention relates to a tool holder for a cutting insert, having a shank; a counter bearing on which a seat for a cutting insert is provided, disposed on the front end of the shank; and a clamping segment integrally joined to the shank via a bending segment, the clamping segment having a clamping finger and a clamping element such that the clamping finger is capable of acting against the counter bearing segment by means of the clamping element, thereby enabling a cutting insert to be clamped between the clamping finger and the counter bearing segment; wherein the clamping segment protrudes above the top side of the shank; and wherein a coolant supply passage extends through the shank and the bending segment into the clamping segment; wherein the coolant supply passage has a shank passage, a clamping finger passage, and a connecting passage that starts from the shank passage and extends through the bending segment.

BACKGROUND

Such a tool holder serves in particular for receiving a comparatively small cutting insert with which grooves or plunge cuts may be created on a tool, in particular upon turning. To this end, the counter bearing segment and the clamping finger are designed to be very narrow, in particular much narrower than the shank with which the tool holder may be clamped to a machine tool, for example a lathe.

The coolant supply passage enables a coolant flow to be delivered to where the workpiece is being machined by the cutting insert. The clamping finger passage typically opens slightly above the cutting insert so the coolant flow is incident on the cutting face in the region of the cutting edge of the cutting insert. Embodiments are also known in which the clamping finger passage is formed partly between the clamping finger and a top side of the cutting insert.

Given tool holders of the type mentioned above, the problem arises that the coolant supply passage must extend from the shank as far as the clamping finger, and therefore through the bending segment. The bending segment should have a comparatively small material cross section, such that the forces provided by the clamping element (typically a clamping screw) may be translated mostly into a clamping force for the cutting insert and are not needed to overcome the resisting force of the bending segment. However, the connecting passage that extends through the bending segment places certain lower limits on the minimum cross section of the bending segment.

From WO 2012/171976, a tool holder of the type mentioned above is known in which the clamping segment is designed to be asymmetrical, namely having a web or projection on one side. The connecting passage is disposed within this region, such that there is still sufficient material on both sides of the connecting passage in the bending segment.

However, given this known tool holder it is disadvantageous that the bending segment has a varying flexural strength along its width, the flexural strength being higher in the region of the projection. This results in an inhomogeneous clamping behavior of the clamping segment. Furthermore, the tool holder is quite complicated to manufacture due to the geometry of the rear side of the clamping segment.

SUMMARY

The object of the invention is to improve a tool holder of the type mentioned above in such a way that a homogeneous clamping behavior of the clamping segment results and the tool holder may be manufactured more easily.

To achieve this object, provision is made according to the invention that the connecting passage is located in a longitudinal center region of the tool holder, and that—on its rear side facing toward the shank—the clamping segment extends less far toward the rear end of the shank on both sides of the center longitudinal region than in its longitudinal center region. The invention is based on the underlying concept of designing the clamping segment to be symmetrical within the bending segment with respect to a vertical plane extending in the longitudinal direction of the shank. Within the region of this plane (that is, centrally), the clamping segment is designed to be "thicker" on its side facing toward the shank, such that sufficient material still remains here despite the connecting passage. To the sides of the connecting passage there is then less material, such that the bending segment as a whole has the desired flexural strength that is not too high. Furthermore, since no contours with acute angles exist on the rear side of the clamping segment, the top side of the shank and the back side of the clamping segment may be manufactured with little effort, in particular may be milled in one pass.

According to one embodiment of the invention, provision is made for the rear side to be of curved design, and the center of curvature is located on the longitudinal center plane of the shank. This results in a rear side without edges.

According to an alternative embodiment, provision is made for the rear side to have a center segment and a respective side segment on both sides thereof, wherein the side segments extend slightly forward starting from the center segment as considered in a plan view. In this embodiment the rear side is composed of three facets, namely the center segment and the two side segments.

The side segments may be designed to be flat or curved. In addition or alternatively, provision may be made for the center segment to be flat. The respective geometry is based on the desired profile of the flexural strength of the bending segment along the transverse direction.

The rear side may extend at an angle in a range of 80° to 120° relative to the top side of the shank. Particularly preferred is an angle of about 90° between the rear side and the top side of the shank.

The connecting passage may extend approximately perpendicular to the longitudinal center axis of the shank. In principle, however, other orientations are possible as well, for example inclined slightly forward.

According to one embodiment of the invention, a transverse passage is provided that connects the connecting passage to the clamping finger passage. The transverse passage preferably extends perpendicular to the longitudinal axis of the shank, such that it does not have any negative effects on the symmetrical profile of the flexural resistance of the bending segment

BRIEF DESCRIPTION OF THE DRAWINGS

The invention will be explained below with reference to a preferred embodiment that is illustrated in the accompanying drawings. In the drawings.

DETAILED DESCRIPTION

Figure 1:
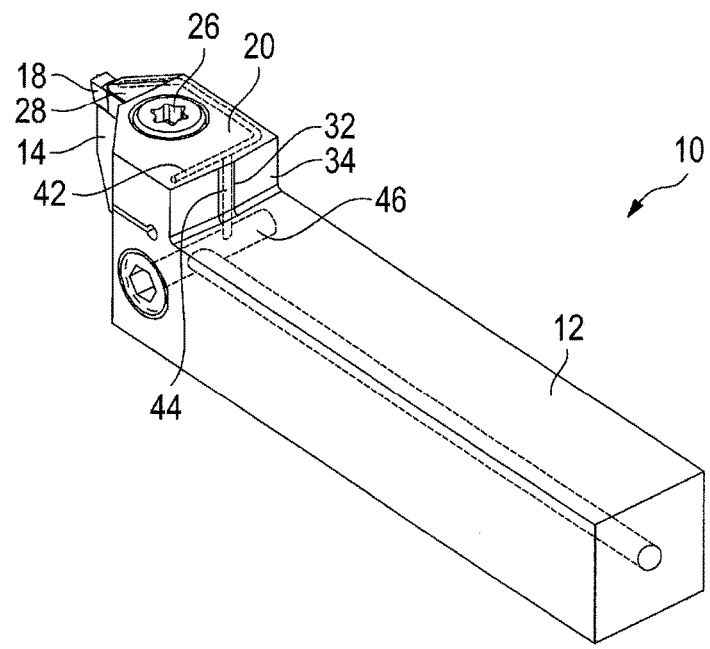
FIG. 1 shows a perspective view of a tool holder according to the invention.

FIGS. 1 to 5 show a tool holder 10 having a shank 12 with which the tool holder 10 may be clamped into a machine tool, for example a lathe.

On one end of the shank, herein referred to as the "front end" the shank is provided with a counter bearing segment 14 on which a seat 16 for a cutting insert 18 is provided. The cutting insert 18 is of a type with which grooves and recesses in particular may be turned.

A clamping segment 20, which here is disposed above the plane defined by the top side of the shank 12 (see FIG. 3), is provided for clamping the cutting insert 18 into the seat 16. The clamping segment 20 is integrally joined to the shank 12 via a bending segment 22. On the side of the bending segment 22 facing away from the shank 12, i.e. "upstream" thereof, the counter bearing segment 14 and the clamping segment 20 are separated by a gap 24.

A clamping element 26 with which the clamping segment 20 may act against the counter bearing segment 14, thus in a direction that causes the gap 24 to narrow, is disposed on the clamping segment 20. This enables a clamping finger 28 disposed on the front end of the clamping segment 20 to clamp the cutting insert 18 in the seat 16.

The clamping element 26 here is a clamping screw, the head of which is accessible on the top side of the clamping segment 20 and which is screwed into a threaded bore in the counter bearing segment 14.

Figure 2:
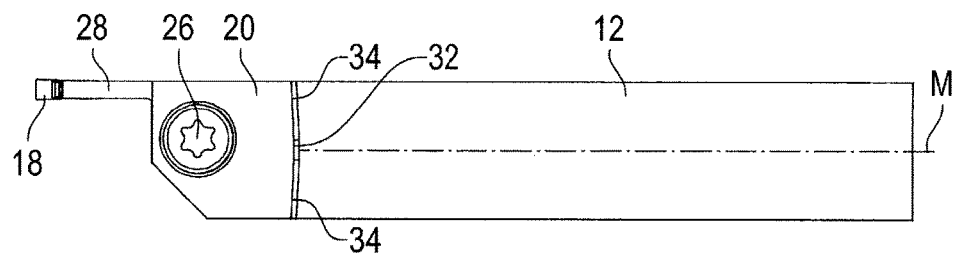
FIG. 2 shows a plan view of the tool holder of FIG. 1.
Figure 3:
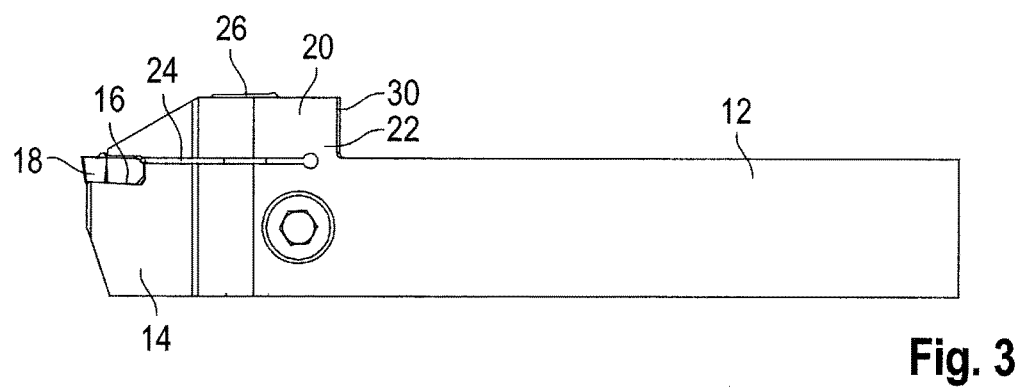
FIG. 3 shows a side view of the tool holder of FIG. 1.

As is particularly apparent from FIG. 2, the counter bearing segment 14 and the clamping finger 28 are designed to be sword-like, thus very narrow and elongated. In particular, the width of the counter bearing segment 14 and of the clamping finger 28 on the front end is less than 20% of the width of the shank, in particular in the range of 15%.

The clamping segment 20 has a rear side 30 representing the transition between the top side of the shank 12 and the top side of the clamping segment 20. As is particularly apparent from FIG. 2, the rear side 30 is not designed flat but is composed here of three segments, namely a center segment 32 and two side segments 34.

The center segment 32 of the rear side 30 is disposed here within the region of a longitudinal center plane, thus a plane extending along the longitudinal axis M of the shank 12 and perpendicular to the top side thereof. Therefore, the longitudinal center plane is perpendicular to the drawing plane of FIG. 2. The center segment 32 of the rear side 30 is oriented here perpendicular to the longitudinal center plane, thus extends transversally to the center axis M. The two side segments 34 are likewise designed to be flat here and, when seen in the plan view of FIG. 2, extend slightly forward starting from the center segment 32. Put differently: their outer edges facing away from the center segment 32 have a greater segment from the rear end of the shank 12 than the center segment 32. The angle between a plane defined by the center segment 32 and the planes defined by the side segments 34 is within a range of 3 to 10°.

Figure 5:
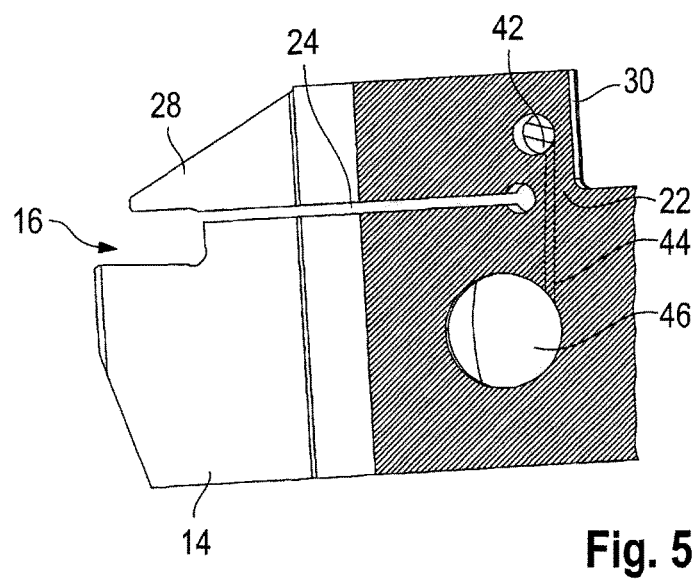
FIG. 5 shows a section along the plane V-V of FIG. 4.

As can further be seen from FIG. 5, the angle between the top side of the shank 12 and the segments of the rear side 30 is 90° here. However, a different angle may also be selected.

The tool holder 10 is provided with a coolant supply passage having a clamping finger passage 40, a transverse passage 42, a connecting passage 44 and a shank passage 46. The passages enable a coolant flow to be directed to where the cutting insert 18 is machining a workpiece.

Figure 4:
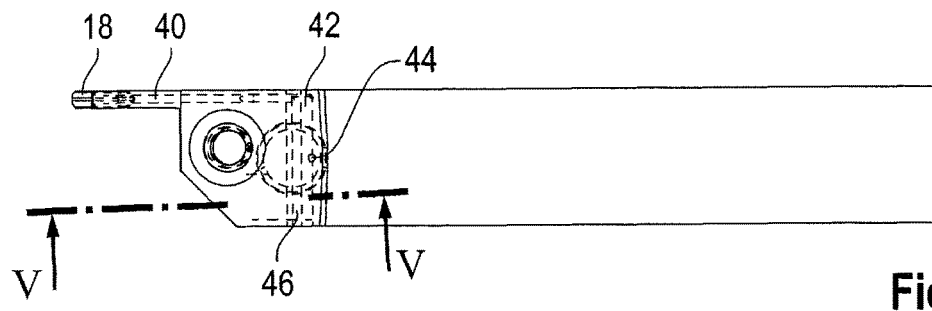
FIG. 4 shows a top view of the tool holder of FIG. 1, wherein the coolant supply passage is shown by a dashed line.

The clamping finger passage 40 extends from a forward segment of the clamping finger 28 as far as into the clamping segment 20. There it encounters the transverse passage 42, which extends transversally to the center axis M through the clamping segment 20. Connected to the transverse passage 42 is the connecting passage 44 which extends here in an approximately vertical direction from the clamping passage 20 as far as down to the plane of the shank 12, where it intersects the shank passage 46. The shank passage 46 may either be a short, transversally extending passage, as shown in FIG. 4, or it may additionally include an extension, which is shown in FIG. 1 and extends as far as to the rear end of the shank. As a result of this, cooling fluid can be supplied either at the front end of the shank or also at the rear end of the shank.

It is an essential feature of the tool holder that the connecting passage 44 is located within the longitudinal center region of the tool holder, thus approximately in the region of the longitudinal center plane. Owing to the special design of the rear side 30 of the clamping segment 20, the connecting passage 44 is thus located within a region of the bending segment in which, when viewed in the longitudinal direction, more material is available than laterally, where the rear side 30 extends more toward the front side of the tool holder.

Therefore, when viewed in a transverse direction, the bending segment 22 has a symmetrical profile of the flexural resistance.

The rear side 30 of the clamping segment 20 does not necessarily need to be executed as three flat segments, as is the case in the illustrated embodiment. It is also possible to design the rear side 30 to be curved, the center point of curvature of the surface of the rear side then being located on the longitudinal center plane, such that a symmetrical profile of the flexural resistance results here as well.

The invention claimed is:

1. A tool holder for a cutting insert having: a shank, a counter bearing on which a seat for a cutting insert is provided, disposed on the front end of the shank, and a clamping segment integrally joined to the shank via a bending segment;

wherein the clamping segment has a clamping finger and a clamping element, such that the clamping finger is capable of being urged against the counter bearing segment by means of the clamping element, thereby enabling a cutting insert to be clamped between the clamping finger and the counter bearing segment;

wherein the clamping segment projects beyond the top side of the shank;

wherein a coolant supply passage extends through the shank and the bending segment into the clamping segment;

wherein the coolant supply passage has a shank passage, a clamping finger passage and a connecting passage that starts from the shank passage and extends through the bending segment;

characterized in that the connecting passage is located in a longitudinal center region of the tool holder, and—on its rear side facing away from the shank—the clamping segment extends less far in a direction toward the rear end of the shank on both sides of the longitudinal center segment than it does in the longitudinal center segment.

2. The tool holder according to claim 1, characterized in that the rear side is of curved design and the center of curvature is located on the longitudinal center plane of the shank.

3. The tool holder according to claim 1, characterized in that the rear side has a center segment and on both sides thereof a side segment, wherein as considered in plan view the side segments extend slightly forward starting from the center segment.

4. The tool holder according to claim 3, characterized in that each of the side segments is flat.

5. The tool holder according to claim 3, characterized in that each of the side segments is curved.

6. The tool holder according to claim 3, characterized in that the center segment is flat.

7. The tool holder according to claim 1, characterized in that the rear side extends at an angle in a range of 80° to 110° relative to the top side of the shank.

8. The tool holder according to claim 7, characterized in that the rear side extends at an angle of about 90° relative to the top side of the shank.

9. The tool holder according to claim 1, characterized in that the connecting passage extends approximately perpendicular to the longitudinal center axis of the shank.

10. The tool holder according claim 1, characterized in that a transverse passage is provided that connects the connecting passage to the clamping finger passage.

* * * * *